United States Patent [19]

Tiemann

[11] 4,375,650

[45] Mar. 1, 1983

[54] SYSTEM FOR PROCESSING VIDEO SIGNALS

[75] Inventor: Jerome J. Tiemann, Schenectady, N.Y.

[73] Assignee: General Electric Company, Schenectady, N.Y.

[21] Appl. No.: 258,856

[22] Filed: Apr. 29, 1981

[51] Int. Cl.³ .................. H04N 7/12; G06F 15/332
[52] U.S. Cl. ................................. 358/133; 358/138; 358/260; 364/725
[58] Field of Search ............... 358/133, 260, 138, 135, 358/136; 340/347 DD; 364/515, 725, 726

[56] References Cited

U.S. PATENT DOCUMENTS

| | | | |
|---|---|---|---|
| 3,976,826 | 8/1976 | Fullton, Jr. ..................... | 358/133 |
| 3,984,626 | 10/1976 | Mounts et al. .................. | 358/133 |
| 4,179,709 | 12/1979 | Workman ........................ | 358/133 |

Primary Examiner—Robert L. Griffin
Assistant Examiner—Edward L. Coles

Attorney, Agent, or Firm—Julius J. Zaskalicky; James C. Davis, Jr.; Marvin Snyder

[57] ABSTRACT

A video processing system in which each field of image data is divided into rows and columns of blocks of picture elements. The number of blocks utilized is large enough so that when each block is considered to be a picture element, the blocks provide a reasonable raster for the peripheral vision aspect of the human visual perception system. The blocks of picture elements are transformed into blocks of spatial frequency components. The zero and low spatial frequency components of the blocks of spatial frequency transforms are updated at a sufficiently rapid rate to satisfy the requirements of the peripheral vision aspect of the human perception system. The higher spatial frequency components of the blocks of spatial frequency are updated at a lower rate corresponding to the rate at which the human perception system can respond to such information.

14 Claims, 12 Drawing Figures

FIG. 3

COLUMN NUMBERS

|   | 0 | 1 | 2 | 3 | 4 | 5 | 6 | 7 |
|---|---|---|---|---|---|---|---|---|
| 0 | $P_{00}$ | $P_{01}$ | $P_{02}$ | $P_{03}$ | $P_{04}$ | $P_{05}$ | $P_{06}$ | $P_{07}$ |
| 1 | $P_{10}$ | $P_{11}$ | $P_{12}$ | $P_{13}$ | $P_{14}$ | $P_{15}$ | $P_{16}$ | $P_{17}$ |
| 2 | $P_{20}$ | $P_{21}$ | $P_{22}$ | $P_{23}$ | $P_{24}$ | $P_{25}$ | $P_{26}$ | $P_{27}$ |
| 3 | $P_{30}$ | $P_{31}$ | $P_{32}$ | $P_{33}$ | $P_{34}$ | $P_{35}$ | $P_{36}$ | $P_{37}$ |
| 4 | $P_{40}$ | $P_{41}$ | $P_{42}$ | $P_{43}$ | $P_{44}$ | $P_{45}$ | $P_{46}$ | $P_{47}$ |
| 5 | $P_{50}$ | $P_{51}$ | $P_{52}$ | $P_{53}$ | $P_{54}$ | $P_{55}$ | $P_{56}$ | $P_{57}$ |
| 6 | $P_{60}$ | $P_{61}$ | $P_{62}$ | $P_{63}$ | $P_{64}$ | $P_{65}$ | $P_{66}$ | $P_{67}$ |
| 7 | $P_{70}$ | $P_{71}$ | $P_{72}$ | $P_{73}$ | $P_{74}$ | $P_{75}$ | $P_{76}$ | $P_{77}$ |

ROW NUMBERS — 17

FIG. 4

21 22 23 COLUMN NUMBERS 24

|   | 0 | 1 | 2 | 3 | 4 | 5 | 6 | 7 |
|---|---|---|---|---|---|---|---|---|
| 0 | $C_{00}$ | $C_{01}$ | $C_{02}$ | $C_{03}$ | $C_{04}$ | $C_{05}$ | $C_{06}$ | $C_{07}$ |
| 1 | $C_{10}$ | $C_{11}$ | $C_{12}$ | $C_{13}$ | $C_{14}$ | $C_{15}$ | $C_{16}$ | $C_{17}$ |
| 2 | $C_{20}$ | $C_{21}$ | $C_{22}$ | $C_{23}$ | $C_{24}$ | $C_{25}$ | $C_{26}$ | $C_{27}$ |
| 3 | $C_{30}$ | $C_{31}$ | $C_{32}$ | $C_{33}$ | $C_{34}$ | $C_{35}$ | $C_{36}$ | $C_{37}$ |
| 4 | $C_{40}$ | $C_{41}$ | $C_{42}$ | $C_{43}$ | $C_{44}$ | $C_{45}$ | $C_{46}$ | $C_{47}$ |
| 5 | $C_{50}$ | $C_{51}$ | $C_{52}$ | $C_{53}$ | $C_{54}$ | $C_{55}$ | $C_{56}$ | $C_{57}$ |
| 6 | $C_{60}$ | $C_{61}$ | $C_{62}$ | $C_{63}$ | $C_{64}$ | $C_{65}$ | $C_{66}$ | $C_{67}$ |
| 7 | $C_{70}$ | $C_{71}$ | $C_{72}$ | $C_{73}$ | $C_{74}$ | $C_{75}$ | $C_{76}$ | $C_{77}$ |

ROW NUMBERS — 20, 25

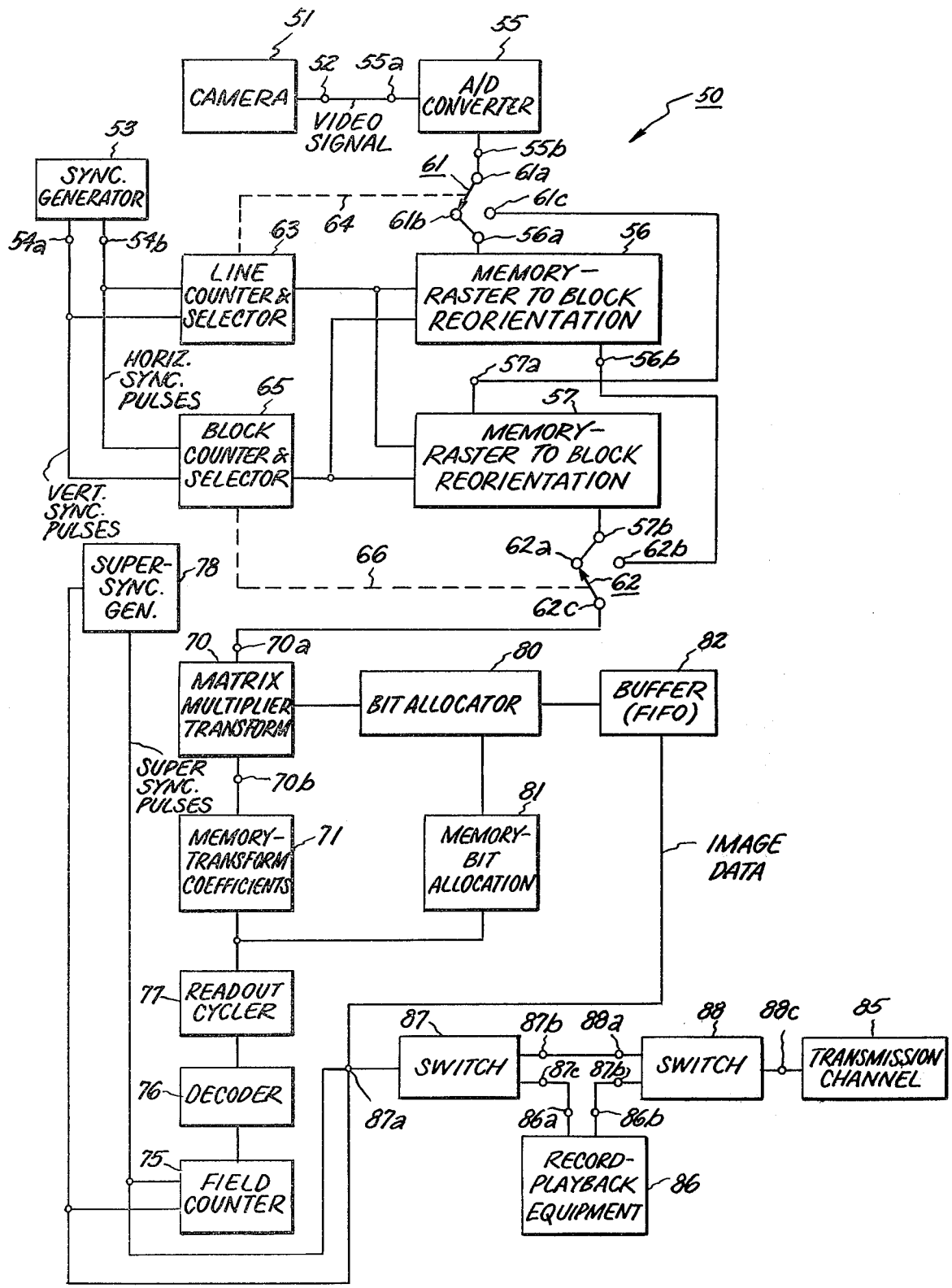

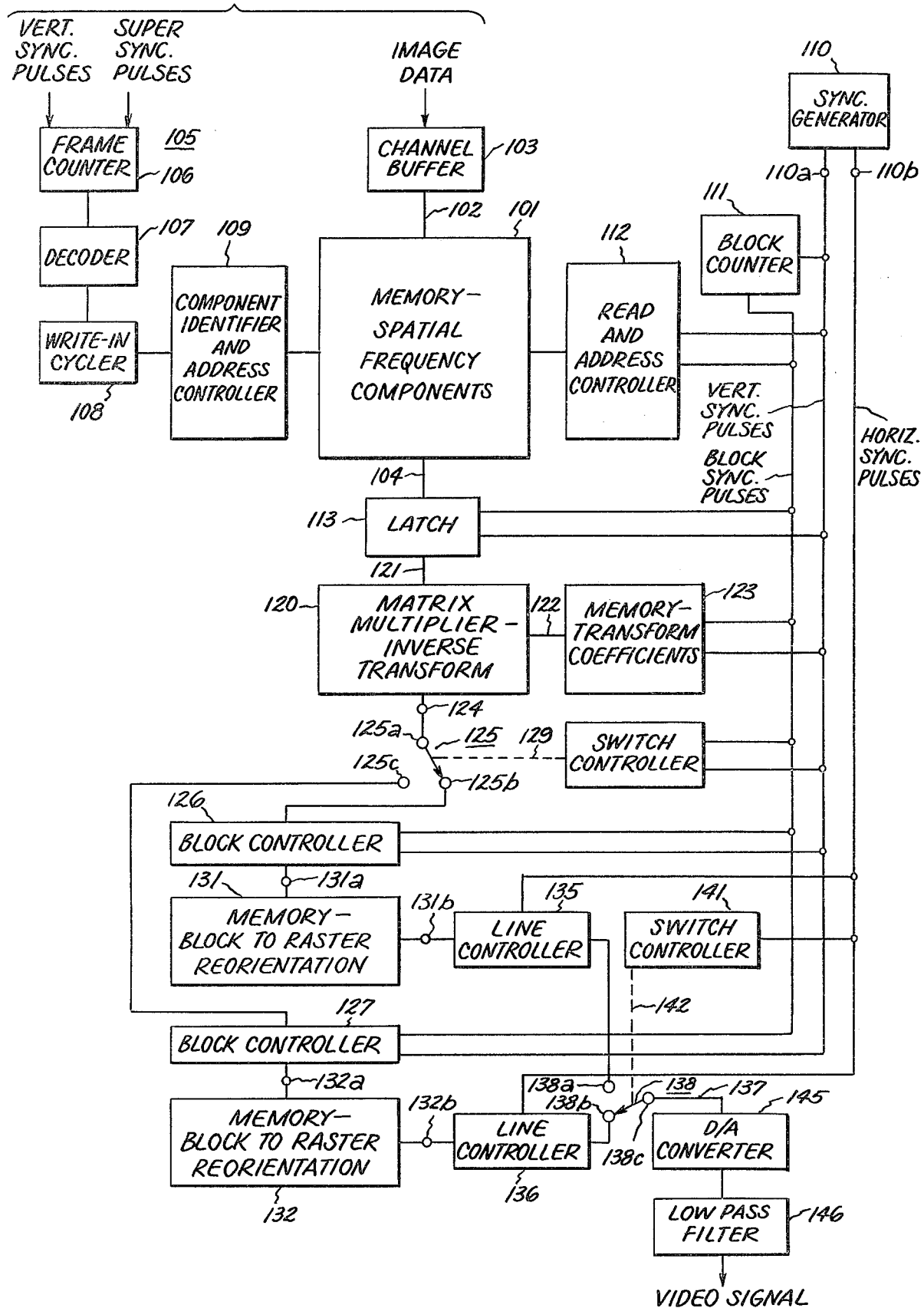

SYSTEM FOR PROCESSING VIDEO SIGNALS

BACKGROUND OF THE INVENTION

The present invention is directed to a system for processing video signals in which bandwidth reduction thereof is accomplished by matching the information supplied to the human visual perception system to the capabilities of the human visual perception system to perceive the information.

The human visual perception system requires a considerable time to collect the image data needed to perceive fine details. This information is perceived by the fovea of the eye and requires many hundreds of microscopic eye movements before the content of the image can be recognized in fine detail. Thus, if rapid motion is occurring in a real time moving picture, information determining high resolution characteristics is not required. Although the peripheral vision or "coarse" vision aspect of the human visual perception system cannot perceive the detail content of an image, it can perceive very rapid movement and requires a high frame rate to avoid the perception of flicker.

Prior art systems for bandwidth reduction have constituted a frame of image data in the form of blocks or arrays of elements and performed two-dimensional transforms thereon to obtain blocks of components of various spatial frequencies. The information content of such a transformed frame of image data is then transmitted without regard to the ability of an human observer to perceive all the detail contained therein in the reconstitution of the frame of image data therefrom. Such prior art systems have been based on the transmission of all the data in a frame up to some resolution limit. Such systems have not provided enough bandwidth reduction without also producing of objectionable motion artifacts such as flicker.

SUMMARY OF THE INVENTION

The present invention is directed to the provision of an image data compression system which produces the best overall perceived image with the smallest number of transmitted bits or equivalently with the smallest bandwidth.

An object of the present invention is to provide a system for bandwidth reduction of a video signal which exploits the limited capability of the human visual perception system to perceive high resolution characteristics in rapidly moving images.

Another object of the present invention is to provide a system for bandwidth reduction of a video signal which matches the supply of information to the human visual perception system to the information gathering capability of the human visual perception system.

Another object of the present invention is to provide a bandwidth reduction system which gives the appearance of a high field rate while also giving the appearance of high resolution without actually requiring that the full resolution of a picture be transmitted during each field.

In carrying out the invention in an illustrative embodiment thereof there is provided a video signal having a plurality of first sequences of values, each value of a first sequence being derived from the intensity of a respective element of a picture having a plurality of elements mapped into rows and columns thereof. The picture is segmented into a plurality of identical blocks of elements, each block having rows and columns of elements, each block of elements represented by a respective set of subsequences of the first sequence of values.

Means are provided for transforming each of the first sequences into a respective second sequence of values. The transformation includes transforming each set of subsequences of a first sequence corresponding to a block of picture elements into a respective set of spatial frequency components of a respective block thereof. Each block of spatial frequency components includes rows representing different values of vertical spatial frequency ranging from low to high values of spatial frequency, and columns representing different values of horizontal spatial frequency ranging from low to high values of spatial frequency, each component being a unique combination of a row and a column spatial frequency. The block of components is segmented into several groups of components, each group including components of a different range of spatial frequency values, the group including the component with both spatial frequency values equal to zero being designated the first group and the group including the component with the largest sum of spatial frequency values being designated the last group. The groups of components includes different numbers of components with the first group including the smallest number of components and at least one of the other groups having the largest number of components. Each second sequence includes a series of sets of components. Each set of a second sequence includes a predetermined number of spatial frequency components from each of the groups arranged in a predetermined order within and among said groups, correspondingly ordered spatial frequency components from the sets of a second sequence having the same spatial frequency values. Sets of components of successive second sequences have successively different combinations of spatial frequency components in accordance with a predetermined schedule. A predetermined number of successive second sequences equal to the number of components in the largest of said groups constitutes a supersequence. Successive supersequences representing successive pluralities of successive pictures corresponds to a scene.

A transmission channel is provided. Means are provided for transmitting the second sequences over the transmission channel. Means are provided for receiving each of the second sequences from the transmission channel. A memory is provided including a plurality of storage locations. Means are provided for storing the value of each of the components included in the supersequences of the second sequences in a respective memory location of the memory corresponding to the spatial frequency values thereof, whereby during any one supersequence all of the values of the components of each of the transmitted groups of each of the blocks of spatial frequency components are stored at least once, and the components of the groups of the blocks of spatial frequency components other than the components of the largest of the groups thereof are updated several times during a period of a supersequence. Means are provided for retrieving each block of components stored in the memory. Means are provided for obtaining the inverse transform of each retrieved block of components to obtain a set of subsequences of values corresponding to the intensity of elements of a respective block of elements of a picture. Means are provided for assembling the sets of subsequences of values to obtain a sequence of values corresponding to the aforementioned first sequence of values.

BRIEF DESCRIPTION OF THE DRAWING

The features which are believed to be characteristic of the present invention are set forth with particularity in the appended claims. The invention itself, both as to its organization and method of operation, together with further objects and advantages thereof may best be understood by reference to the following description taken in connection with the accompanying drawings in which:

FIG. 3 shows a single block of picture elements of the raster of FIG. 2. The block of picture elements includes 64 elements arranged in eight rows and eight columns.

FIG. 4 shows a block of spatial frequency components representing the transformation of the spatial distribution of picture elements of the block of FIG. 3 into spatial frequency components. The block of components is segmented into several groups of components.

FIG. 7 shows a block diagram of apparatus for the conversion of a video signal, such as shown in FIG. 1, into successive fields of information, such as shown in FIGS. 5A–5E, for transmission over a transmission channel of reduced bandwidth or recording on a suitable recording medium.

FIG. 8 shows a block diagram of apparatus for the reception of information from a plurality of fields of a video signal in the form as shown in FIGS. 5A–5E and the storage thereof. The storage means includes a storage location for each spatial frequency component of each of the block of picture elements of a picture which is utilized in the system. The apparatus also includes means for readout of the information in storage block by block and the conversion thereof into a video signal suitable for reconstitution of the original scene.

DETAILED DESCRIPTION OF THE INVENTION

Figure 1:
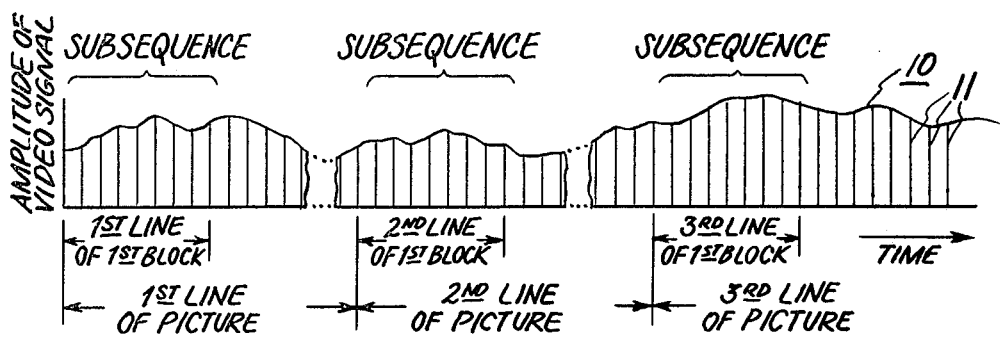
FIG. 1 shows a graph of a portion of video signal of a picture.

Reference is now made to FIG. 1 which shows a video signal 10 such as would be obtained from a television camera scanning the elements of a picture line by line. The video signal 10 represents a portion of a field and includes several lines of the picture. The ordinates 11 shown represent intensity values or amplitudes of successive samples of the picture. Conveniently, the sequence of amplitudes of the samples is referred to as a first sequence of values.

Figure 2:
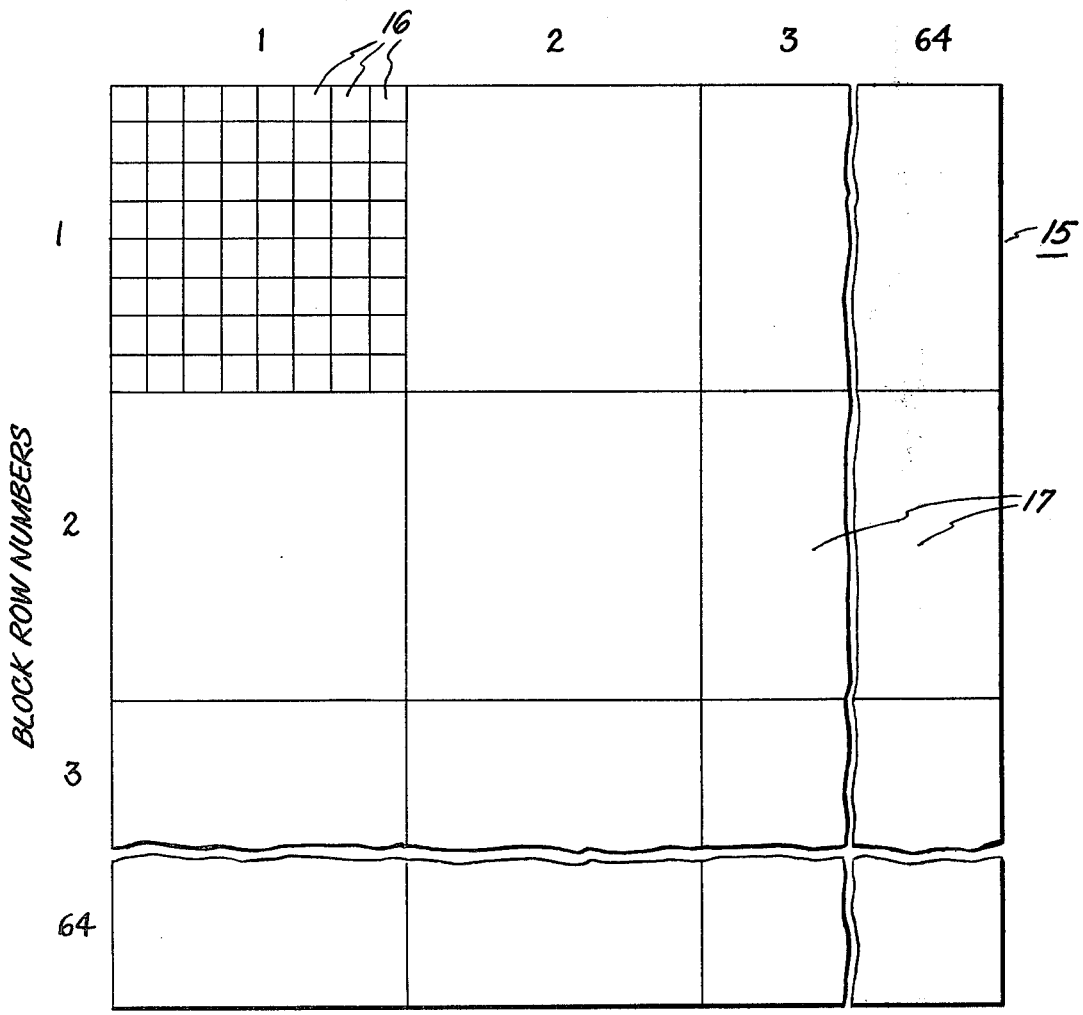
FIG. 2 shows a portion of the raster of a picture consisting of a plurality of picture elements arranged into a plurality of rows and columns. The picture is shown segmented into a plurality of blocks of picture elements, with each block having a plurality of rows and columns.

FIG. 2 shows a portion of the raster 15 of the picture including a plurality of elements 16. The elements 16 are arranged in 512 rows and 512 columns. The elements of the picture are segmented into a plurality of blocks 17, each of which is identical and consists of 8 rows and 8 columns of elements. Thus a total of 4096 blocks arranged in 64 rows and 64 columns are included in a picture. The sequence of values of the picture elements of the first row of the first block constitutes a subsequence of values. The sequence of values of the picture elements of the second row of the first block constitutes another subsequence of values. Similarly, the sequence of values corresponding to the third row of elements of the first block constitute a third subsequence and so on. The eight subsequences of values corresponding to the eight rows of the picture elements of the first block are referred to as a set of subsequences. Each of the other blocks of picture elements has a respective set of subsequences.

FIG. 3 shows a single block or array 17 of picture elements such as the first block in the first row of blocks of FIG. 2 in which the picture elements are arranged in 8 rows designated 0 through 7 and 8 columns designated 0 through 7. A particular picture element is designated by the symbol P followed first by a row subscript and then a column subscript. Each block 17 of picture elements such as shown in FIG. 3, is transformable into a block 20 of components of different spatial frequency values such as shown in FIG. 4.

FIG. 4 shows the complete transformation of the block 17 of picture elements into a block 20 of spatial frequency components. The components are arranged in eight rows and eight columns. The rows are designated respectively 0 through 7. The columns are designated respectively 0 through 7. Each of the components is designated by the symbol C with appropriate subscripts identifying its row and column location. Each of the components represents a respective basis picture block representable by a basic picture mathematical function. A component with a row subscript of 0 corresponding to the location thereof in the first row signifies that the basis picture has no transition from dark to light in the vertical direction in the block. A component with a row subscript of 1 corresponding to the location thereof in the second row signifies that the basis picture has one transition from dark to light in the vertical direction. A component with a column subscript of 0 corresponding to the location thereof in the first column signifies that the basis picture has no transition from dark to light in the horizontal direction in the block. A component with a column subscript of 1 corresponding to the location thereof in the second column signifies that the basis picture has one transition from dark to light in the horizontal direction in the block. The value amplitude of a component signifies its relative strength in relation to the other components. The superposition or summation of all of the basis pictures represented by a block components of spatial frequency in their relative amplitudes would reproduce the original block of picture elements from which the transformed block was obtained.

The transformation of a block of picture elements into a block of spatial frequency components may be represented by the equation:

$$C_{ij} = \sum_{kl} M_{ijkl} \cdot P_{kl}, \quad (1)$$

where $P_{kl}$ is the value or intensity of the $k^{th}$ picture element in $l^{th}$ row of picture elements, $M_{ijkl}$ is the coefficient of a transformation matrix, connecting the amplitude of the $kl^{th}$ picture element to the $ij^{th}$ frequency component.

$C_{ij}$ is the amplitude of the spatial frequency component in the $i^{th}$ row and the $j^{th}$ column.

Thus, for an 8×8 block of picture elements, in which there are 64 picture elements and 64 spatial frequency components, a 64 by 64 matrix of coefficients would be utilized to obtain an 8 by 8 block of spatial frequency components. To obtain a selected component, for example, the component $C_{23}$, each picture element is multiplied by coefficients whose first two indices are 2 and 3, and whose third and fourth indices correspond to the row and column numbers of that picture element. These 64 product terms are then summed to form $C_{23}$.

The inverse transformation of a block of spatial frequency components may be represented by the equation:

$$P_{ij} = \sum_{kl} M^{-1}_{ijkl} \cdot C_{kl}, \quad (2)$$

where $C_{kl}$ is the amplitude of the $k^{th}$ component in the $l^{th}$ row of components, $M^{-1}_{ijkl}$ is the coefficient of the inverse transformation matrix connecting the $kl^{th}$ transform coefficient with the $ij^{th}$ picture element.

$P_{ij}$ is the value of picture element in the $i^{th}$ row and the $j^{th}$ column.

To achieve the result of the transformation of a block of picture elements into a block of spatial frequency components thereof and the inverse transformation of a block of spatial frequency components to recover a block of picture elements requires the selection of a transformation matrix which has an inverse. Various transformation matrices meet this requirement. One such is the discrete cosine transform, others being the Walsh Hadamarch transform and the Fourier transform, for example. All three of these transforms have the property that they can be factored into two successive transformations, one involving only the elements in one row, and the other involving only the elements in one column. Thus the 64×64 matrices alluded to above can be implemented by a repeated application of an 8×8 matrix. The procedure is to use this 8×8 matrix to transform each row into a transformed row and to then transform each column of the transformed rows into a transformed column. This greatly simplifies the calculation. In the notation outlined above, the matrix elements $M_{ijkl}$ can be written as $$M_{ijkl} = M_{kl} M_{ij}$$

where the coefficients $M_{kl}$, which constitute a one-dimensional transform, form an 8×8 matrix in the case considered here. The coefficients of 8×8 even discrete cosine transform matrix is set forth below in Table 1. The coefficients of the inverse of this matrix is set forth below in Table 2.

TABLE 1

EVEN DISCRETE COSINE TRANSFORM MATRIX

| .3536 | .3468 | .3266 | .2940 | .2500 | .1964 | .1353 | .0690 |
|---|---|---|---|---|---|---|---|
| .3536 | .2940 | .1353 | −.0690 | −.2500 | −.3468 | −.3266 | −.1964 |
| .3536 | .1964 | −.1353 | −.3468 | −.2500 | .0690 | .3266 | .2940 |
| .3536 | .0690 | −.3266 | −.1964 | .2500 | .2940 | −.1353 | −.3468 |
| .3536 | −.0690 | −.3266 | .1964 | .2500 | −.2940 | −.1353 | .3468 |
| .3536 | −.1964 | −.1353 | .3468 | −.2500 | .0690 | .3266 | −.2940 |
| .3536 | −.2940 | .1353 | .0690 | −.2500 | .3468 | −.3266 | .1964 |
| .3536 | −.3468 | .3266 | −.2940 | .2500 | −.1964 | .1353 | −.0690 |

TABLE

EVEN DISCRETE COSINE INVERSE TRANSFORM MATRIX

| .3535 | .3535 | .3535 | .3535 | .3535 | .3535 | .3535 | .3535 |
|---|---|---|---|---|---|---|---|
| .6935 | .5879 | .3928 | .1380 | −.1380 | −.3928 | −.5879 | −.6935 |
| .6533 | .2707 | −.2707 | −.6533 | −.6533 | −.2707 | .2707 | .6533 |
| .5879 | −.1380 | −.6935 | −.3928 | .3928 | .6935 | .1380 | −.5879 |
| .5000 | −.5000 | −.5000 | .5000 | .5000 | −.5000 | −.5000 | .5000 |
| .3928 | −.6935 | .1380 | .5879 | −.5879 | −.1380 | .6935 | −.3928 |
| .2707 | −.6533 | .6533 | −.2707 | −.2707 | .6533 | −.6533 | .2707 |
| .1380 | −.3928 | .5879 | −.6935 | .6935 | −.5879 | .3928 | −.1380 |

In accordance with one aspect of the present invention, each block 20 of spatial frequency components is segmented into a plurality of groups of components, each group including one or more components. In FIG. 4, the components are segmented into five groups 21-25. The first group 21 consists of the component $C_{00}$ representing the DC or zero frequency component of the block of components. The second group 22 consists of three components, namely, $C_{01}$, $C_{10}$, and $C_{11}$. The third group 23 consists of nine components, namely, $C_{02}$, $C_{03}$, $C_{12}$, $C_{13}$, $C_{20}$, $C_{21}$, $C_{22}$, $C_{30}$, and $C_{31}$. The fourth group 24 consists of twenty-seven components, namely, $C_{04}$, $C_{05}$, $C_{06}$, $C_{07}$, $C_{14}$, $C_{15}$, $C_{16}$, $C_{17}$, $C_{23}$, $C_{24}$, $C_{25}$, $C_{26}$, $C_{32}$, $C_{33}$, $C_{34}$, $C_{40}$, $C_{41}$, $C_{42}$, $C_{43}$, $C_{50}$, $C_{51}$, $C_{52}$, $C_{60}$, $C_{61}$, $C_{62}$, $C_{70}$, $C_{71}$. The fifth group consists of the remaining 24 components, namely, $C_{27}$, $C_{35}$, $C_{36}$, $C_{37}$, $C_{44}$, $C_{45}$, $C_{46}$, $C_{47}$, $C_{53}$, $C_{54}$, $C_{55}$, $C_{56}$, $C_{57}$, $C_{63}$, $C_{64}$, $C_{65}$, $C_{66}$, $C_{67}$, $C_{72}$, $C_{73}$, $C_{74}$, $C_{75}$, $C_{76}$ and $C_{77}$. The first group includes the $C_{00}$ component representing the DC or zero frequency level of the block of picture elements. The fifth or last group includes the highest spatial frequency components of the transformed block. In accordance with another aspect of the present invention the fifth or last group is not utilized or sent in the transmission. In accordance with a further aspect of the present invention a component from each of the first four groups of each of the blocks of transform components is selectively derived from the blocks of a first field of video information in the manner explained above and transmitted as a sequence of values over a transmission channel. The sequence is conveniently referred to as a second sequence of values.

Figure 5A:
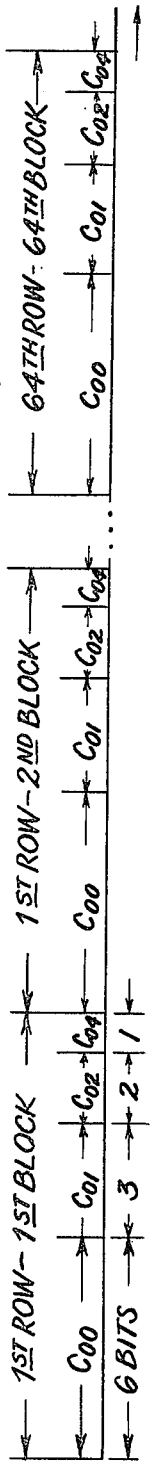
FIGS. 5A–5E show a plurality of sequences of binary data for successive fields of video signals, each sequence including the value or amplitude selected spatial frequency components from each block of spatial frequency components of a respective field suitable for transmission over a transmission channel.
Figure 5B:
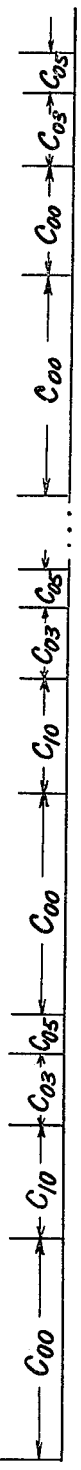
Figure 5C:
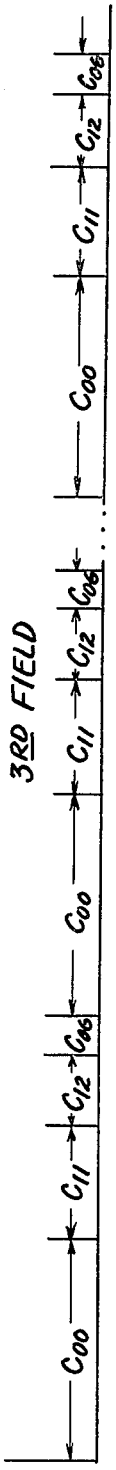
Figure 5D:
Figure 5E:

For a second sequence of values derived from a field of the video signal identically designated components from each of the groups of each of the transform blocks is derived and transmitted and in the same order. For example, in the first field the components $C_{00}$, $C_{01}$, $C_{02}$, and $C_{04}$ from each of the transformed blocks are derived, as shown in FIG. 5A. The amplitude of the components of FIG. 5A and also FIGS. 5B through 5E are represented by binary words with the amplitude of the components of the first through fourth groups allocated 6, 3, 2, and 1 bits or binary digits, respectively. From the second field of video information another combination of four components, namely components $C_{00}$, $C_{10}$, $C_{03}$, $C_{05}$ from each transform block is derived and transmitted, as shown in FIG. 5B. Similarly, from the third field of the video signal the components $C_{00}$, $C_{11}$, $C_{12}$, and $C_{06}$ from each of the transformed blocks are derived and transmitted, as shown in FIG. 5C. During the fourth field of the video signal the components $C_{00}$, $C_{01}$, $C_{13}$ and $C_{07}$ from each of the transformed blocks are derived and transmitted, as shown in FIG. 5D. For the 27th field, as shown in FIG. 5E, the components $C_{00}$, $C_{11}$, $C_{31}$, and $C_{71}$ from each of the transform blocks is derived and transmitted. Thus after 27 fields of transmissions all of the components of the first, second, third and fourth group have been sent at least once. A complete set of transmissions consisting of 27 second sequences is referred to as a supersequence. As the fourth group includes 27 components, each of the components of this group are transmitted once during the period of a supersequence. As the third group includes 9 components, each of the components of this group are transmitted three times during the period of a supersequence. Each of the 3 components of the second group are transmitted nine times during the period of a supersequence. The component of the first group, the DC or zero frequency component, is transmitted 27 times during the period of a supersequence. Preferably, the value of the components is represented in digital form enabling the magnitudes or amplitudes of the components of different groups to be sent with different degrees of resolution.

In the present embodiment the component of the first group is transmitted with the highest resolution representing greatest member of different levels of amplitude and the fourth group is sent with the lowest resolution or smallest number of different levels of amplitude. Conveniently, the first through fourth groups have been shown as represented by six bits, three bits, two bits and one bit, respectively. The selective transmission of components as described above and the transmission of the selected components with different resolutions considerably reduces the bandwidth required for the transmission or storage of the video signal.

Figure 6:
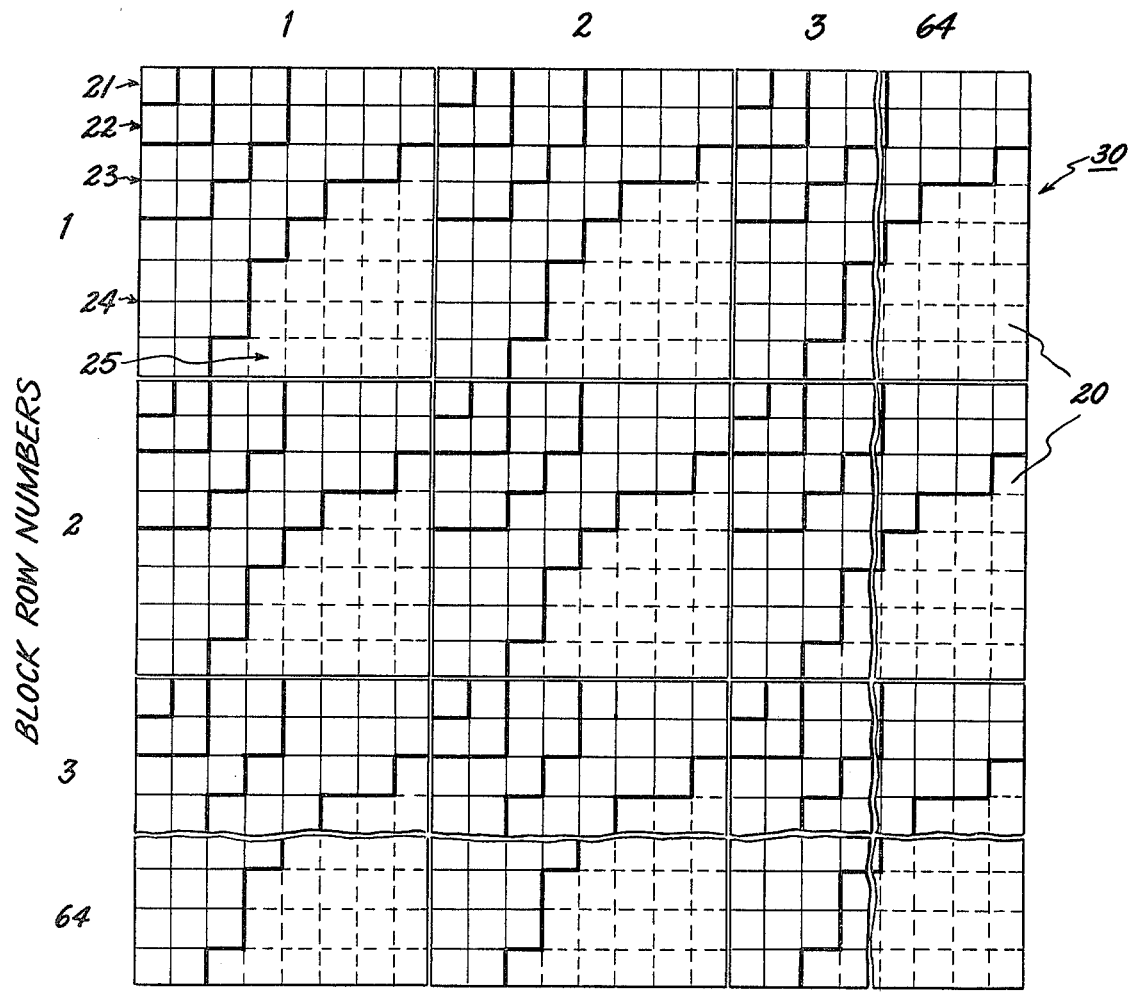
FIG. 6 shows a portion of a map including a plurality of blocks of spatial frequency components, each block corresponding to a transformed block of picture elements, each block also including identically designated components and representing components of a plurality of fields. Each of the components of the map is stored in a respective memory location and is updated from transformations of various fields of video information in accordance with a predetermined schedule.

Reference is now made to FIG. 6 which shows a map 30 of blocks 31 of spatial frequency components, arranged in rows and columns, each block 20 corresponding to a transform of a respective block 17 of raster 15 of FIG. 2. In particular, the elements of the first, second, third and fourth group, namely, the components of the blocks that were sent in the 27 fields of transmission selectively shown in FIGS. 5A-5E, not including the components of the fifth group of each of the transform blocks which were not sent. The map corresponds to memory locations for each of the designated components. The magnitude or amplitude of the component included in the location represents the amplitude of the component most recently received over a transmission channel. As pointed out above, the $C_{00}$ component for each of the blocks is received during every field of operation so it is updated every field. If there are 60 fields per second, it is updated 60 times every second. The components of the second group are updated every third field, or once every 1/20 of a second. Similarly, the components of the third group are updated every nineth field, or once every 9/60 of a second and the components of the fourth group are updated once every 27/60 of a second.

In accordance with a further aspect of the present invention, the order in which the components from each of the groups is included in a set of components for a field, is identical and is prearranged, and the scheduling of the combination of components in each field is also prearranged with each field of transmission having its particular combination of components.

In accordance with a further aspect of the present invention, at the receiving station, each of the fields of transmission are detected and each component is directed to its unique memory location where it is stored until it is updated by a subsequent transmission.

At the receiving station, each block of spatial frequency components is retrieved and transformed into a block of picture elements. From a row of blocks of picture elements eight successive lines of video signal are derived representing successive values of the intensity of the picture elements of the lines thereof. From each successive row of blocks of picture elements a respective set of eight lines of video signal is derived. Thus, a video signal is reconstructed corresponding to the video signal utilized in the transmission. Preferably fields of video information are reconstructed at a rate comparable to the field rate of the video signal utilized at the transmission station.

As pointed out above, the picture is divided into 64 rows and 64 columns of blocks, each block including eight rows and eight columns of elements. The picture consisting of 64 rows and 64 columns of blocks represents a reasonable raster for the peripheral or "coarse" vision of the human perception system. As the DC component $C_{00}$ of each of the transform blocks is transmitted every field, namely, 60 times per second, each block in this 64 by 64 block raster is updated every 1/60th of a second. In addition, this component is transmitted with a high degree of resolution or accuracy. Thus, a good picture is provided for the peripheral or "coarse vision" mechanism of the eye and as this picture is updated at a very high rate, good motion perception and rendition is provided. The high degree of accuracy or transmission of the DC component and some of the lower frequency components enhances the resolution of the 64 by 64 block picture. As the high resolution mechanism of human visual perception system requires a greater time to respond to the higher frequency components or higher resolution components of the picture, these elements or components are transmitted at a successively lower rate. The components of the second group represent low frequency components and are transmitted at a lower rate than the DC component but relatively frequently. The components of the third group are transmitted at a still lower rate and the components of the fourth group are transmitted at a still lower rate. For the spatial components included in the fourth group, the response time of the human visual perception system is an appreciable fraction of one second. Thus, transmission of each component of this group at a rate of about two transmissions per second would appear to be adequate.

While different spatial frequency components corresponding to each of the blocks of picture elements are transmitted at different rates. After the components have been assembled in memory, the components are retrieved and inversely transformed into picture elements at a high rate corresponding to the field rate of the original video signal thereby avoiding artifacts such as flicker, mentioned above. Thus, the system gives the appearance of a high field rate while also giving the appearance of high resolution without actually requiring that the full resolution of a picture be transmitted during each field of video signal.

Reference is now be made to FIGS. 7 and 8 for a description of apparatus for implementing the transformation of the video signal of FIG. 1, the transmission thereof, or the recorder thereof for later playback, and the inverse transformation thereof to reconstitute the video signal, as described above in connection with FIGS. 1 through 6.

Referring now particularly to FIG. 7, the transmission station 50 includes a camera or a video signal source 51 which provides at terminal 52 a video signal such as shown in FIG. 1 consisting of successive fields, each field consisting of a plurality of horizontal lines. Each field of information is obtained by scanning an image to be televised line by line. Conveniently, the format of the picture or image is considered to consist of 512 rows and 512 columns of elements. A synchronizing signal generator 53 provides timing information in the form of vertical and horizontal synchronization markers or pulses which mark the beginning of a field and the beginning of a line of a video signal respectively. The vertical synchronization pulses appear at terminal 54a and the horizontal synchronization pulses appear at terminal 54b.

As described above, each field of information representing a picture consisting of 512 rows and 512 columns of picture elements is segmented into blocks of picture elements consisting of 64 rows of blocks and 64 columns of blocks, each block consisting of 8 rows and 8 columns of picture elements. Each block of picture elements is thereafter transformed into a respective set of spatial frequency components which are assembled into a second sequence for transmission over a channel of reduced bandwidth or recording on a suitable recording medium for playback at a later time. The segmentation of the video signal in line format into block format is provided by a first random access memory (RAM) 56 and a second random access memory 57 identical to memory 56. Each of memories 56 and 57 has a capacity sufficient to store 8 lines picture element values in digital form, each line having 512 picture element samples or values and each value having a resolution of 64 levels represented by 6 bits. Successive sets of 8 lines of video signal corresponding to a row of 64 blocks of picture elements are alternately written into and stored in memory 56 and memory 57. While information is serially being read into one memory, the other memory is accessed to read out successive blocks of video information for processing. Memory 56 includes an input terminal 56a consisting of six lines corresponding to the 6 bits utilized to represent the value of a picture element and also includes an output terminal 56b having 48 lines corresponding to the eight columns, each of which has six bit lines, in a block of picture elements. Similarly, memory 57 includes an input terminal 57a having six lines and an output terminal 57b having 48 lines. An analog-to-digital converter 55 is provided for converting each of the values of the video signal referred to as the first sequence of values into a six bit word.

The analog-to-digital converter includes an input terminal 55a to which the video signal is applied and an output terminal 55b consisting of six lines corresponding to the six bits of the binary word. For switching a stream of video data from one memory to the other memory, a switch 61 is provided. Also far switching from the output of one memory to the output of the other memory for accessing blocks of picture element values, a switch 62 is provided. Switch 61 is functionally a 6 pole-double throw switch in which 6 input lines are connected to one of two sets of 6 output lines in response to the actuation thereof. Switch 61 has an input terminal 61a, an output terminal 61b and an output terminal 61c. Switch 62 is functionally a 48 pole-double throw switch in which 48 input lines are connected to one of two sets of 48 output lines in response to the actuation thereof. The switch 62 has an input terminal 62a, an output terminal 62b and an output terminal 62c. The output terminal 55b of the analog-to-digital converter 55 is connected to the input terminal 61a of switch 61. The output terminal 61b of switch 61 is connected to the input terminal 56a of memory 56 and the output terminal 61c of switch 61 is connected to the input terminal 57a of memory 57. The output terminal 57b of memory 57 is connected to the input terminal 62a of switch 62 and the output terminal 56b of memory 56 is connected to the input terminal 62b of switch 62. The output terminal 62c of switch 62 is connected to the input terminal 70a of matrix multiplier 70. The switch 61 is actuated or shifted from one position to the other in response to a signal received from block counter and selector 63 over linkage element 64, shown as a dotted element, functionally operating on the position of the switch 61. In response to vertical and horizontal synchronization pulses from terminals 54a and 54b, block counter and selector 63 provides an output which actuates the switch 61 to set it in one position or the other depending upon which memory is being accessed for blocks of picture element samples or values. At the start of a field of information the switch 61 is actuated to connect the output of the analog-to-digital converter 55 to the input of the memory 56 for storage of 8 lines of video information therein. At the end of such storage, the line counter and selector 63 shifts the switch 61 to its other position thereby supplying of video information from analog-to-digital converter 55 to the memory 57. The switch 62 is actuated or shifted from one position to the other position in response to a signal received from block counter and selector 65 over linkage element 66, shown as a dotted element, functionally operating on the position of the switch 62. In response to vertical and horizontal synchronization pulses from terminals 54a and 54b, block counter and selector 65 provides an output which actuates the switch to set it in one position or the other depending upon which memory is being accessed for blocks of picture element values. At the start of a field of information switch 62 is actuated to connect the output from memory 57 to read out blocks of image data stored therein from a previous insertion of 8 lines of image data therein. At the end of read out of the blocks of image data stored in memory 57 and also after 8 lines of image data has been written into memory 56, the line counter and selector 65 causes the switch 62 to switch shift to its other position and initiate read out blocks of image data from memory 56.

The conversion of each block of picture elements into components of a block of spatial frequency components thereof is accomplished in the matrix multiplier 70 which has an input terminal 70a consisting of 48 lines over which a block of picture elements are supplied thereto. It includes another input terminal 70b over which coefficients of a multiplying matrix for converting the values of the picture elements into spatial frequency components is supplied. As pointed out above the coefficients of the multiplying matrix are for the discrete cosine transform. An output terminal 70c is provided consisting of six lines over which a set of spatial frequency components, in particular the amplitudes thereof, one from each of the first four groups depicted in FIG. 4 is obtained and in a predetermined order. From the first transformed block of the first field for the conversion effected for the first set, the amplitudes of components $C_{00}$, $C_{01}$, $C_{02}$, $C_{04}$ would be provided on the output lines in the order recited as shown in FIG. 5A. Each of the values of the components would be with 6 bit accuracy or resolution. The matrix multiplier would be provided with the same information on the same components and in the same order in each of the succeeding block of the field of picture elements. The multiplying coefficients are provided from read only memory (ROM) 71 which is under the control of a chain of functional blocks consisting of a field counter 75, a decoder 76 and a readout cycler 77. A supercycle pulse generator 78 is provided which has an input connected to the vertical sync pulse terminal 54a and provides an output pulse marking the beginning of each supercycle consisting of a plurality of fields. For the present embodiment the supercycle consists of 27 fields of video information. The field counter 75 which is under control of the super sync pulses from generator 78 and the vertical sync pulses from generator 53 provides a coded output to the decoder 76. The decoder 76 provides an output which programs the readout cycler 77. The readout cycler 77 controls memory 71 to provide the proper set of coefficients in the proper time sequence to the matrix multiplier 70 so that each of the second sequences for a respective field in a supersequence includes the predetermined sets of multiplying coefficients to obtain the predetermined spatial frequency components and in the proper order.

Each of the spatial frequency components obtained at the output of the matrix multiplier 70 are provided with 6 bit accuracy or resolution. As components from different groups of the block of transform components are transmitted with different accuracy, bit allocation for components must be provided. This is done by bit allocator 80. Bit allocator 80 is under the control of a read only memory (ROM) 81 which, in turn, is under the control of the readout cycler 77. The readout cycler 77 controls the memory 81 which in turn controls the bit allocator 80 to allocate the appropriate number of bits to each of the components of a set of components of the second sequence. Six output lines are provided on the bit allocator 80 and the output thereof is provided to a buffer stage 82 in which the bits of a set of components are serial inserted and then serially read out on a FIFO basis (first-in first-out) to equalize the bit rate of the second sequence. The digital output of the buffer 82 along with the supersync pulses and the vertical sync pulses are then supplied to an appropriate transmission channel 85, such as a transmission line or a radio frequency relay for transmission to a receiving station. These signals may also be alternatively supplied to recording and playback equipment 86 for recording on a suitable recording medium for later recovery thereof and reconstitution of the video signal. To this end a pair of switches 87 and 88 are provided. Switch 87 has a multielement input terminal 87a and a pair of multielement output terminals 87b and 87c. Switch 88 has a pair of multielement input terminals 88a and 88b and a multielement output terminal 87c. The recorder 86 has a multielement input terminal 86a and a multielement output terminal 86b. The switch 87 is a two-position switch. In a first position the input terminal 87a is connected to the output terminal 87b and in the second position, input terminal 87a is connected to the output terminal 87c. Similarly, the switch 88 is a two-position switch. In a first position the input terminal 88a is connected to the output terminal 88c and in the second position the input terminal 88b is connected to the output terminal 88c. The image data line from buffer 82 and the supersync and the vertical sync pulse lines from the supersync generator 78 and the sync generator 53 are connected to the input terminal 87a of switch 87. The output terminal 87b of switch 87 is connected to the input termial 88a of switch 88. The output terminal 87c of switch 87 is connected to the input terminal 86a of recorder 86. The output terminal 86b of equipment 86 is connected to the input terminal 88b of switch 88. The output terminal 88c of switch 88 is connected to the transmission channel 85. Thus, with both switches 87 and 88 in their first positions the input at switch 87 is transmitted directly to the transmission channel. With the switch 87 in second position, the output of the transmission station 50 is applied to the input terminal of the equipment 86. With the equipment 86 set to record, the output of the transmission station would be recorded on the recording medium thereof. To recover the information stored on the recording media in the equipment 86, the switch 88 would be set to its second position and the equipment would be switched to play back. Thus, the output of the recorder would be applied through switch 88 to the transmission channel 85 for transmission to a receiving station for further processing at a receiving station as will be described below in connection with FIG. 8.

Referring now to FIG. 8, the receiving station 100 comprises a memory 101 for storage of one value of all of the transmitted spatial frequency components of the transform blocks of elements of a picture. The memory 101 has an input bus 102 consisting of six lines to which data in digital form is supplied and also includes an address on which information is supplied for storage of the words of image data at a specific location in the memory 101. The map of FIG. 6 sets forth the storage sites or locations provided in the memory 101. The data obtained from the transmission channel comprises a stream of bits in the form of a plurality of supersequences, each supersequence including, for the example set forth in connection with FIGS. 1-5, 27 sequences, each sequence representing the transmission of information derived from a field of the video signal, as shown in connection with FIGS. 5A-5E. The serial data bit stream is applied to a channel buffer 103 which segments the bit stream into words, each word representing the amplitude of a respective spatial frequency component. At the output of the channel buffer data words consisting of at most six bits appear and are applied to the input data bus 102 of the memory 101. It will be recalled that the amplitudes of the components of the first, second, third and fourth groups described in connection with FIG. 4 are provided with resolution of 6, 3, 2 and 1 bit, respectively.

The identification and storage of the spatial frequency component at the proper location or address in memory 101 is accomplished by the chain 105 of functional blocks consisting of a frame counter 106, a decoder 107, a write-in cycler 108 and a component identifier and address controller 109. The vertical sync pulses and the supersync pulses obtained from the transmission channel are applied to the frame counter 106 which develops a code identifying each sequence of a super sequence in relation to the field, one of 27 fields for the example under consideration, from which it was derived. As noted above each sequence of a supersequence is referred to as a second sequence. The field code is applied to the write-in cycler 108 which provides a sequence of codes, each code corresponding to a respective field of information. Each code of the sequence supplied by the write-in cycler programs the component identifier and address controller 109 to provide the respective addresses in proper sequence for location of the words representing spatial frequency components of a respective field. Each code of the write-in cycler 108 has programmed into it the components of the first four groups of a block of transform components constituting a set of a respective second sequence and includes the order in which these components are included in the respective second sequence. At the transmission station 50 the read-out cycler 77 determined the components from each group of components which are included in a second sequence and the order in which they are included for each field of information. Thus, after 27 second sequences of image data, each second sequence representing a field of video information, is received, all of the storage locations of the memory 101, as set forth in the map of FIG. 6 are filled. As pointed out above, the image data in some of the groups of each of the segmented transform blocks of information has been updated several times during this supersequence of 27 second sequences. In particular, the component of the first group has been updated 27 times, the components of the second group have been updated 9 times, components of the third group have been updated 3 times and the components of the fourth group have been transmitted just once. As successive second sequences of successive supersequences are received, the spatial frequency component data is continuously being updated at the rate indicated so that the picture of the spatial frequency components is constantly changing in accordance with the change occuring in the picture at the transmission station. However, only selected changes are made in the frequency components and at a particular rate as explained in connection with FIGS. 1-5.

The reception station 100 also includes apparatus for the continuous conversion of the blocks of spatial frequency component data stored in memory 101, corresponding to blocks of picture elements of the original picture, into a video signal at the field rate comparable or the same as the field rate of the original video signal enabling the original picture to be reproduced as far as the human perception can determine, with as good a quality as the original picture. To this end, each block of spatial frequency component data is converted into a respective block of picture element data. The blocks of picture element data are assembled into rows of blocks of such data and such rows of blocks of data are converted into lines of data from which the video signal can be obtained.

The basic timing for the conversion of spatial frequency data stored in memory 101 into a video signal is provided by a local sync generator 110 and block counter 111. The sync generator 110 provides vertical synchronization pulses at terminal 110a and horizontal synchronization pulses at terminal 110b. The block counter 111 provides block synchronization pulses. Conveniently the vertical sync pulse rate may be the same as the vertical sync pulse rate of the original video signal, for example 60 cycles per second, and also the horizontal sync pulse rate may be the same as in the original video signal, for example, 15750 kilocycles. Each vertical sync pulse occurs at the start of a field and each horizontal sync pulse occurs at the start of a line. As 64×64 or 4096 blocks of picture elements are included in a picture, the block counter would provide 4096 block synchronization pulses in the period of a field, each pulse occurring at the start of access to block of image data in memory. The number of pulses occurring after a vertical sync pulse will be referred to as the block code. Thus, there are 4096 block codes.

In response to a specific block code the read and address controller 112 provides a specific address to memory 101 which accesses and retrieves a specific block of spatial frequency components. Thus, codes are provided in succession from a preset reference point in time corresponding to the occurrence of a vertical sync pulse to the read and address control unit 112 which provides control signals on the address lines of the memory for accessing each of the blocks of spatial frequency component data included in the memory 101. Data appears on the output bus 104 thereof and is stored on a latch 113 connected to the output bus. The conversion of each block of spatial frequency components into a block of picture elements is performed by matrix multiplier 120 which has an input bus 121 to which a block of spatial frequency components are entered from latch 113. The matrix multiplier 120 also includes an input bus 122 to which a matrix of transform coefficients are entered for converting each block of spatial frequency components into a respective block of picture elements. The values of the block of picture elements appear at the output bus 124 of the 120. The time of entering each block of spatial frequency components from latch 113 into the block transform generator 120 is controlled a respective block code supplied by the readout block counter 111 to latch 113. Also the time of entering each matrix of transform coefficients from the read only memory 123 into the block transform generator 120 is controlled by a respective block code supplied by read out block counter 11 to memory 123.

To assemble the blocks of picture element data into rows of blocks of data from which lines of data may be obtained and, in turn, fields of video information including successive lines may be obtained, a pair of random access memories 131 and 132 are provided. Each of the memories 131 and 132 stores a row of blocks of picture element information from which 8 lines of video information are derived in sequence. The memory 131 includes an input terminal 131a representing a plurality of lines on which blocks of picture element information are supplied to the memory 131 and includes an output terminal 131b, representing a plurality of lines on which lines of video information are obtained. Similarly, memory 132 includes an input terminal 132a representing a plurality of lines on which the block of picture element information is supplied and an output terminal 132b representing a plurality of lines on which lines of video information are obtained. For switching the block of picture element information appearing at the output of the matrix multiplier 120 to one or the other of the memories 131 and 132, a switch 125 is provided. The switch 125 is functionally a multi-pole, double throw switch having an input terminal 125a including a plurality of lines and a pair of output terminals 125b and 125c, each including a plurality of lines. The input terminal 125a is connected to the output of bus 124 of the matrix multiplier 120. The output terminal 125b is connected to a block controller 126, the output of which is connected to the input terminal 131a of the memory 131. The output terminal 125c is connected to the input terminal of the block controller 127, the output of which is connected to the input terminal 132a of the memory 132. In response to a control signal received from block switch controller 128 represented by dotted line 129, the pole of switch 125 is connected to one output terminal 125b or the other output terminal 125c thereof to direct information into one or the other of the memories 131 and 132. The block switch controller 128 is responsive to the block codes received from the block counter 111 to switch from one position to the other every row of 64 blocks or 8 lines of video information. Thus, during the read-out of one row of blocks, the terminal 125a of switch 125 contacts terminal 125b to direct blocks of video information into memory 131 and during readout of a succeeding row of blocks the terminal 125a of switch 125 contacts output terminal 125c to direct blocks of video information into memory 132. The block controller 126 is under the control of codes block counter 111 to direct insertion of each block of picture element information into a respective location in memory 131 block-by-block. Similarly, the block controller 127 is under the control of codes from block counter 111 to direct the insertion of blocks of picture element information block-by-block in memory 132.

Readout of video information in line format from the memory 131 is accomplished by a line controller 135 in response to horizontal sync pulses from sync generator 110. The line controller accesses video information stored in memory 131 a line at a time and assembles the information into a succession of lines which appear at the output bus thereof. The output bus of line controller 135 includes six lines on which each word of video information representing the value or amplitude of a picture element is obtained. Similarly, readout of each line from memory 132 is accomplished by line controller 136 in response to horizontal sync pulses from local sync generator 110. The line controller 136 accesses video information stored in memory 132 a line at a time and assembles it into a succession of lines which appear at the output bus thereof. The output bus of line controller 136 includes six lines on which each word of video information representing the value of amplitude of a picture element is obtained. As mentioned above, the memories 131 and 132 are operated alternately. While memory 131 is being filled with blocks of picture element information, memory 132 is being operated in a mode to read out the lines of information stored in a row of blocks. After the read-out of lines in memory 132 has been completed, the RAM switch 125 shifts the output of 120 to the input of memory 132 for assembling another row of blocks of picture element information while memory 131 is now filled and ready for readout line-by-line. This requires that the outputs of the line controllers 135 and 136 be switched alternately to a common output bus 137. This is accomplished by a second switch 138 functionally a 6 pole, double throw switch having a pair of input terminals 138a and 138b and an output terminal 139c. The input terminal 138a includes a plurality of lines connected to the output bus of line controller 135 and the input terminal 139b includes a plurality of lines connected to the output bus of line controller 136. The output terminal 138c is connected to the bus 137. Switch 138 is under the control of the switch controller 141 which, in response to horizontal sync pulses from sync generator 110, applies control shown in the form of a dotted line 142 to control the position of the poles of the switch 138 to access the output of the appropriate one of line controllers 135 and 136. An analog-to-digital converter 145 is provided, the input of which is connected the bus 137. At the output of the digital-to-analog converter 145 appear signal levels representing values or samples of a sequence. A low pass filter 146 is provided at the output of the digital-to-analog converter 145 to filter out the high frequency components of the sequence. At the output of the filter 146 a video signal is obtained representing the reconstituted video signal.

In operation, a video signal of a scene is obtained from camera 51. The video signal comprises a plurality of fields each consisting of a plurality of lines of video information. A vertical sync pulse is provided by sync generator 53 at the beginning of each field of video information. A horizontal sync pulse is provided by sync generator 53 at the beginning of each line of video information. For the specific embodiment described, information from 27 fields of video signal is processed to provide a field of spatial frequency information at the receiving station from which a video signal representing the original scene is developed. To mark the beginning of a cycle of signal processing and to identify each of the fields which require specific processing at the transmission station and corresponding processing at the receiving station a supersync pulse is provided by super sync generator for every 27 vertical sync pulses.

The video signal is applied to an analog-to-digital converter 55 which converts the analog signal into a digital signal. A first set of eight successive lines of the video signal is stored in one raster to block orientation memory 56 and a second successive set of successive lines is stored in the other raster to block orientation memory 57. While the latter operation is occurring the image data in memory 56 is accessed block-by-block and applied to the matrix multiplier 70. When memory 57 has been filled it is accessed block-by-block, while memory 56 is now provided with a third successive set of lines of video information. In response to codes obtained from the read out cycler 77, transform coefficients are supplied from ROM 71 to the matrix multiplier 170 which develops values for the spatial frequency components for each of the four groups of spatial frequency components of each of the blocks and in the proper order for the particular field number.

At the output of the matrix multiplier 70 each of the spatial frequency components are obtained with six bit accuracy. As all of the components do not require the same degree of accuracy the bit allocator 80 allocates the appropriate bits of resolution to each spatial frequency component. In the embodiment described, the components of the first group have the highest accuracy and the components of the fourth group have the lowest accuracy. The buffer 82 equalizes the unequal rate at which bits appear at the output of the bit alloctor 80. At the output of the buffer 82, image data in the form of binary words is obtained and is available for transmission over a transmission channel or for recording in a suitable recorder 86 for playback at a later time, either through the transmission channel or locally at the receiving station. The vertical sync pulses and the supersync pulses are recorded simultaneously transmitted (or recorded) along with the image data to enable processing of the image data at the receiving station to reconstruct the video signal.

At the receiving station, the spatial frequency components of each field of information, such as shown in FIGS. 5A–5E, is stored at appropriate addresses in memory 101. The appropriate address for each component is supplied by component identify and address controller 109 in response to vertical sync pulses and supersync pulses supplied through the functional chain consisting of the frame counter 106, decoder 107 and write-in cycler 108. After 27 fields of processed image data has been supplied, the selected spatial frequency components for each of the blocks of spatial frequency components of a picture has been received at least once and stored in memory. The DC or zero spatial frequency component has been updated every field. The components of the second, third and fourth groups have been updated at successively lower rates. Thus, after the occurrence of 27 fields or a cycle of operation the spatial frequency components of a picture have been stored in memory. As it has taken 27 fields in which to supply this information, the bandwidth is considerably less than the bandwidth which would be necessary to supply to memory 27 complete fields of information in which every spatial frquency component is updated every field. As pointed out above, the human perception system does not require that all spatial frequency components be updated at this high rate.

In accordance with the present invention, the information stored in memory is read out at field rates sufficiently high to avoid flicker in the reproduced picture and preferably at a rate comparable to the field rate of the original video signal. Timing for the readout is provided by the sync generator 110 which develops vertical pulses at a field rate sufficiently high to avoid flicker and also produces horizontal sync pulses to effect the conversion of blocks of spatial frequency information into lines of video information. A block counter 111 is provided which provides block sync pulses in response to vertical sync pulses. The number of block pulses occurring after a vertical sync pulse is identified with each block of spatial frequency components and is utilized in the processing thereof. In response to the block codes from the block counter, the information stored in memory is accessed and retrieved block-by-block, and is transformed into blocks of picture element data in the matrix multiplier 120. A first row of 64 blocks is stored in a first block-to-raster reorientation memory 131 and a second row of 64 blocks is stored in a second block-to-raster reorientation memory 132. While the latter operation is occurring the image date in memory 131 is accessed line-by-line and provided to digital-to-analog converter 145. When memory 132 has been filled, it is accessed line-by-line while memory 131 is now provided by a third row of blocks of video information. The digital-to-analog converter converts the video signal in digital form to a video signal in analog form. After low pass filtering in low pass filter 146, a video signal representing the original scene is obtained.

While each field of the video signal included all elements of the picture. If desired, video in the form of interlaced fields could be utilized in which the odd numbered rows of elements are included in one field and the even numbered rows are included in the other field. Together the two fields include all of the picture elements and constitute a frame. One mode of conversion of such a video signal to spatial frequency components for transmission and reconversion to another video signal corresponding to original video signal would be to form two separate video signals, one for odd rows of picture elements and the other for the even rows of pictures. Each video signal would be processed in the same way at the transmission station, sent separately in the transmission channel, and processed separately at the receiving station into separate video signals. The two video signals at the receiving station would then be interleaved to obtain the original video signal. Of course, only one of the video signals could be utilized, if desired, with the result that the less bandwidth would be required and of course less resolution would be obtained in the reconstructed video signal. If the video signal includes a color or chrominance component in addition to the luminance component, it could be removed and separately processed.

While the picture was considered to be constituted of 512×512 picture elements, of course, other sizes could be used. While the picture was segmented into blocks of 8×8 elements, other size blocks and also of other rectilinear forms could be used.

While a specific scanning method was used other scanning methods could be used, if desired.

While the discrete cosine matrix and its inverse were utilized to obtain the direct transformation and the inverse transform, respectively, any other direct transform maxtrix having an inverse transform matrix could be used such as the odd cosine transform matrix and its inverse, the Walsh-Hadamard transform matrix and its inverse, or the "Fourier" transform and its inverse, for example.

While each block of spatial frequency components was divided into five groups of particular configurations with each group including a specific number of components, other numbers of groups with other configurations and other numbers of components in each group could be utilized, as desired. Also, any desired number of components from each group, including zero, could be utilized.

The bandwidth reduction technique of the present invention can be combined with other independent bandwidth reduction techniques so as to provide an overall bandwidth reduction even greater than can be achieved by the method disclosed herein.

While the invention has been described in a specific embodiment, it will be understood that modifications may be made by those skilled in the art, and it is intended by the appended claims to cover all such modifications and changes as fall within the true spirit and scope of the invention.

What is claimed is:

1. In combination,
means for providing a video signal having a plurality of first sequences of values, each value of a first sequence derived from the intensity of a respective element of a picture, said picture having a plurality of elements mappable into rows and columns thereof, said picture being segmented into a plurality of identical blocks of elements, each block having rows and columns of elements, each block of elements represented by a respective set of subsequences of said first sequence of values,
means for transforming each of said first sequences into a respective second sequence of values, said transformation including transforming each set of subsequences of a first sequence corresponding to a block of picture elements into a respective set of spatial frequency components of a respective block thereof, each block of spatial frequency components including rows representing different values of vertical spatial frequency ranging from low to high values of spatial frequency, and columns representing different values of horizontal spatial frequency ranging from the low to high values of spatial frequency, each component being a unique combination of a row and a column spatial frequency, said block of components being segmented into several groups of components, each group including components of a different range of spatial frequency values, the group including the component with both spatial frequency values equal to zero being designated the first group and the group including the component with the largest sum of spatial frequency values being designated the last group, said groups of components including different numbers of components, the first group including the smallest number of components and at least one of the other groups having the largest number of components, each second sequence including a series of sets of components, each set of a second sequence including a predetermined number of spatial frequency components from each of said groups arranged in a predetermined order within and among said groups, correspondingly ordered spatial frequency components from said sets of a second sequence having the same spatial frequency values, sets of components of successive second sequences having successively different combinations of spatial frequency components in accordance with a predetermined schedule, a predetermined number of successive second sequences equal to the number of components in the largest of said groups constituting a supersequence, successive supersequences representing successive pluralities of successive pictures corresponding to a scene.

2. The combination of claim 1 in which said predetermined number of spatial frequency components from said last group included in said sets of said second sequences is zero, and in which a supersequence is constituted of a predetermined number of successive second sequences equal to the number of components in the largest of said groups excluding the last of said group.

3. The combination of claim 1 including a storage medium and means for storing each of said values of said second sequences of said supersequences in said storage medium.

4. The combination of claim 3 including means for recovering each of said values of said second sequences of said supersequences from said storage medium,
a memory including a plurality of storage locations,
means for storing the value of each of the components included in said supersequences of said second sequences in a respective memory location of said memory corresponding to the spatial frequency values thereof, whereby during any one supersequence all of the values of the components of each of the groups of each of said blocks of spatial frequency components are stored at least once, and the components of the groups of said blocks of spatial frequency components other than the components of the largest of said groups thereof are updated several times during the period of a supersequence,
means for retrieving each block of components stored in said memory,
means for obtaining the inverse transform of each retrieved block of components to obtain a set of subsequences of values corresponding to the intensity of elements of a respective block of elements of a picture,
means for assemblying said sets of subsequences of values to obtain a sequence of values corresponding to said first sequence of values.

5. The combination of claim 1 including a transmission channel,
means for transmitting said second sequences over said transmission channel,
means for receiving each of said second sequences from said transmission channel,
a memory including a plurality of storage locations,
means for storing the value of each of the components included in said supersequences of said second sequences in a respective memory location of said memory corresponding to the spatial frequency values thereof, whereby during any one supersequence all of the values of the components of each of the groups of each of said blocks of spatial frequency components are stored at least once, and the components of the groups of said blocks of spatial frequency components other than the components of the largest of said groups thereof are updated several times during the period of a supersequence,
means for retrieving each block of components stored in said memory,
means for obtaining the inverse transform of each retrieved block of components to obtain a set of subsequences of values corresponding to the intensity of elements of a respective block of elements of a picture,
means for assembling said sets of subsequences of values to obtain a sequence of values corresponding to said first sequence of values.

6. The combination of claim 1 in which the values of said second sequences are in the form of binary words.

7. The combination of claim 6 in which the words of the components of the group having the smallest number of components include the largest number of bits and the words of the components of the group having the largest number of components include the smallest number of bits.

8. The combination of claim 1 in which each of said blocks of components of spatial frequencies is a discrete cosine transform of a respective block of picture elements.

9. The combination of claim 1 in which each of said blocks of components of spatial frequencies is a Walsh-Hadamard transform of a respective block of picture elements.

10. The combination of claim 1 in which each of said blocks of components of spatial frequencies is a Fourier transform of a respective block of picture elements.

11. The combination of claim 4 in which the operation of said means for retrieving and said means for transforming each block of components to obtain a respective set of subsequence of values, and said means for assemblying said sets of subsequences of values into a first sequence of values occurs over an interval relatively short in relation to the period of a supersequence.

12. The combination of claim 4 including means programmed in accordance with said predetermined order and said predetermined schedule to direct each of said components of said second sequences to a respective preassigned storage location in said memory.

13. The combination of claim 5 in which the operation of said means for accessing and said means for transforming each block of components to obtain a respective set of subsequences of values, and said means for assemblying said sets of subsequences of values into a first sequence of values occurs over an interval relatively short in relation to the period of a supersequence.

14. The combination of claim 5 including means programmed in accordance with said predetermined order and said predetermined schedule to direct each of said components of said second sequences to a respective preassigned storage location in said memory.

* * * * *